United States Patent [19]
Hirose et al.

[11] Patent Number: 5,177,428
[45] Date of Patent: Jan. 5, 1993

[54] INVERTER CONTROL DEVICE CAPABLE OF SUPRESSING DC MAGNETIZATION IN THREE-PHASE TRANSFORMER

[75] Inventors: Syunichi Hirose; Haruhisa Inokuchi, both of Tokyo, Japan

[73] Assignee: Kabushiki Kaisha Toshiba, Kawasaki, Japan

[21] Appl. No.: 757,213

[22] Filed: Sep. 10, 1991

[30] Foreign Application Priority Data

Sep. 12, 1990 [JP] Japan .................................. 2-239883

[51] Int. Cl.⁵ ............................................ H02M 7/757
[52] U.S. Cl. ..................................... 323/207; 307/45; 363/58; 363/96
[58] Field of Search .................. 307/45, 46; 323/207; 363/35, 51, 58, 96

[56] References Cited

U.S. PATENT DOCUMENTS 4,878,026 10/1989 Moreau et al. .................... 324/547

FOREIGN PATENT DOCUMENTS 0220638 5/1987 European Pat. Off. .
0361389 4/1990 European Pat. Off. .
64-1429 1/1989 Japan .
1-152928 6/1989 Japan .

OTHER PUBLICATIONS

Patent Abstracts Of Japan, vol. 14, No. 328, (E-952), Jul. 13, 1990, & JP-A-2-111-266, Apr. 24, 1990, K. Arai, "Controller of Inverter for System Interconnection".
Patent Abstracts Of Japan, vol. 10, No. 117, (E-400), May 2, 1986, & JP-A-60-249-874, Dec. 10, 1985, H. Kouno, et al., "Preventing Method of Irregular Magnetization of Transformer for Inverter".
Patent Abstracts of Japan, vol. 14, No. 297, (E-945), Jun. 27, 1990, & JP-A-2-095-179, Apr. 5, 1990, S. Sato, "Controlling of Inverter".
PCIM '88 Proceedings: pp. 343-351; "Application of a digital instantaneous current control for static induction thyristor converters . . . "; Hirose et al.

Primary Examiner—William H. Beha, Jr.
Attorney, Agent, or Firm—Oblon, Spivak, McClelland, Maier & Neustadt

[57] ABSTRACT

An inverter control device that controls a self-commulated inverter connected to an AC power system via a three phase transformer and in so doing suppresses DC magnetization in the three-phase transformer. The device includes a current DC component detecting circuit for detecting the current DC components contained in at least two of the three phase output AC currents of the inverter and a DC magnetization suppressor signal generating circuit for producing two correcting signals from the current DC components. The two correcting signals are used to balance in amount the three voltage DC components contained in the three phase output AC voltage of the inverter, respectively. An output reference correcting circuit is provided to correct two of first output references in accordance with the two correcting signals and output three second references including the two corrected values and one of the first output reference. A gate control circuit controls the three phase output AC voltages of the inverter according to the three second output references.

4 Claims, 3 Drawing Sheets

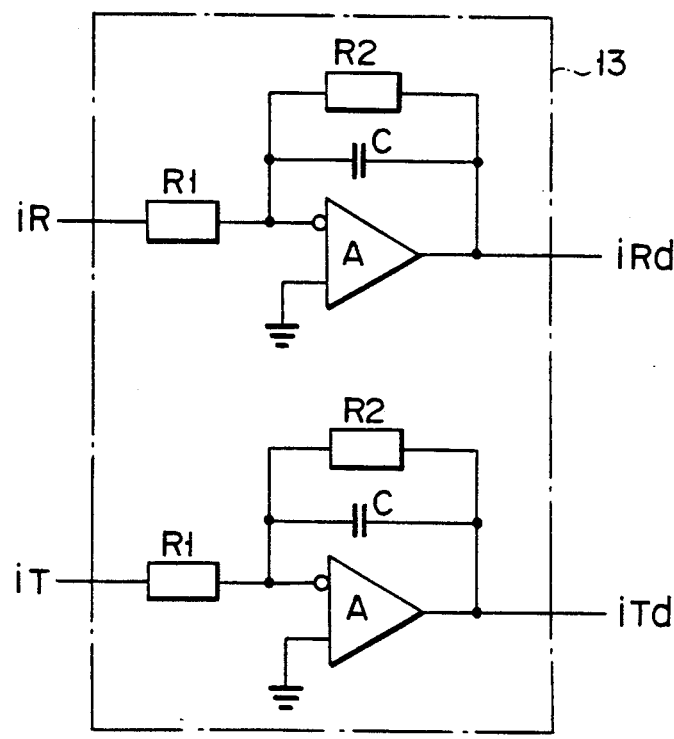
F I G. 2
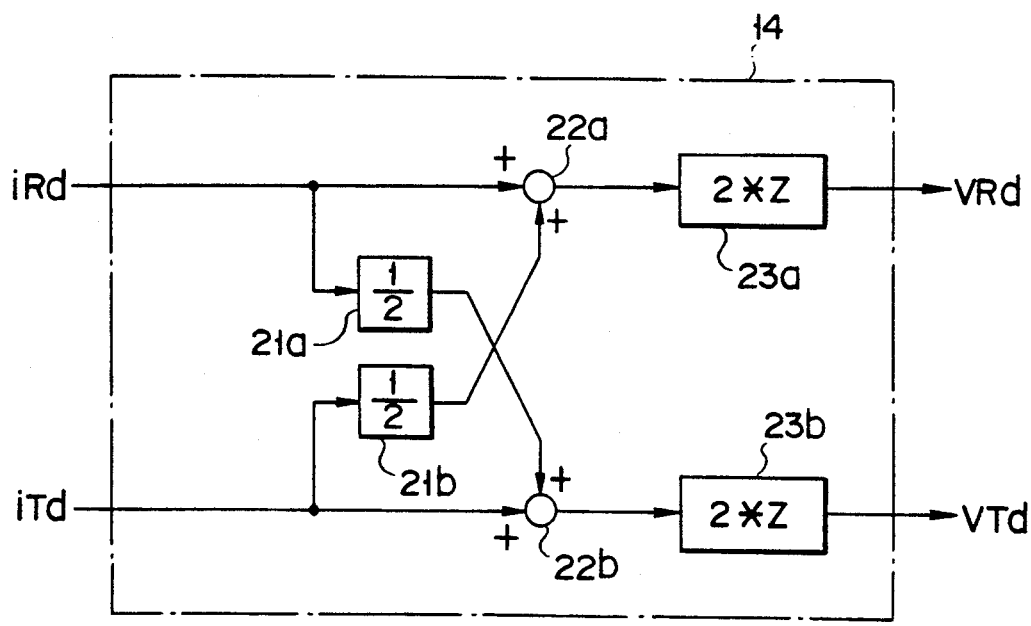
F I G. 3

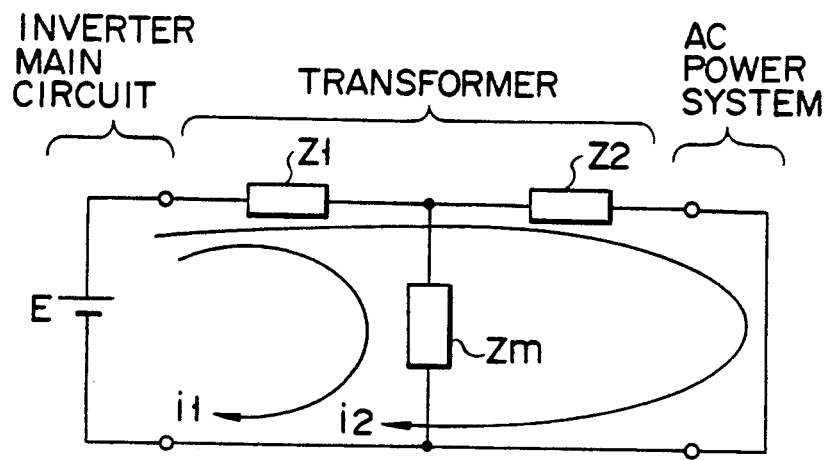
F I G. 4
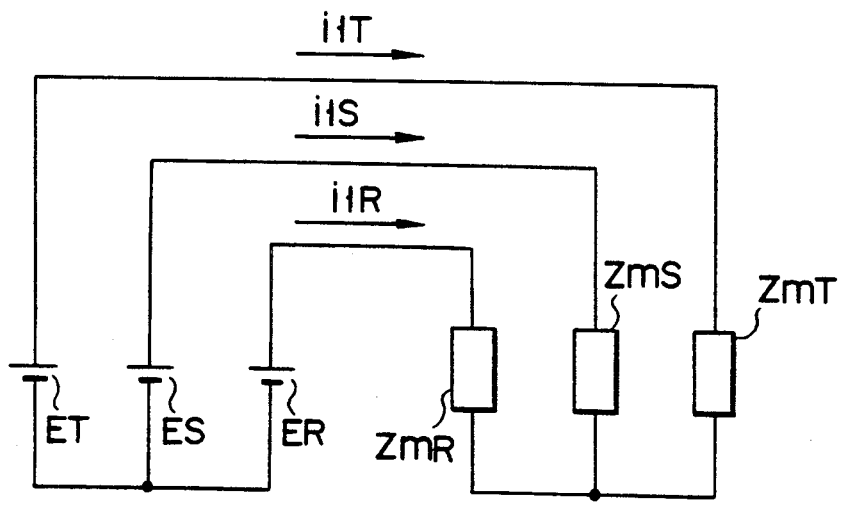
F I G. 5

INVERTER CONTROL DEVICE CAPABLE OF SUPRESSING DC MAGNETIZATION IN THREE-PHASE TRANSFORMER

BACKGROUND OF THE INVENTION

1. Field of the Invention

This invention relates to a control device that controls a self-commutated inverter connected to an AC (alternating-current) power system via a three-phase transformer, and more particularly to an inverter control device that suppresses DC (direct-current) magnetization generated in three-phase transformer.

2. Description of the Related Art

Large capacitance self-commutated inverters have been used to regulate the reactive power of a power system or to supply the DC power from fuel cells or secondary batteries to a power system.

A typical voltage self-commutated inverter is composed of an inverter main circuit, which contains a plurality of controllable rectifier elements and a plurality of rectifier elements, a DC capacitor connected across a DC side terminals of the inverter main circuit, and a three-phase transformer having the inverter side terminals connected to a AC side terminals of the inverter main circuit on a phase basis and the system terminals connected to the system on a phase basis.

Such an inverter is able to control the three phase output voltages of the inverter main circuit by changing ON time of the individual controllable rectifier elements. The current exchanged with the AC power system via the impedance of the three-phase transformer can be controlled by regulating the phase and amplitude of the three phase output voltages from the inverter main circuit according to the phase and amplitude of the AC system voltage.

Such inverter control is performed by an inverter control device. Based on the active current reference value and reactive current reference value, the inverter control device determines an inverter output voltage reference value that decides the three phase output voltages of the inverter main circuit and then supplies a gate signal corresponding to the inverter output voltage reference value to the inverter main circuit to control the ON time of each controllable rectifier element. This converts the DC power from the DC voltage source connected to the DC side terminals of the inverter main circuit into an effective power and supplies it to the AC power system or regulates the reactive power of the AC power system.

The above-mentioned inverter control device has the following problem: a constant generation of a small amount of DC component in the three phase output AC voltages of the inverter main circuit creates a DC component in the alternating magnetic flux in the three-phase transformer, causing an excessive exciting current to flow. That is, DC magnetization in the three-phase transformer gives rise to overcurrent.

When DC magnetization in the three-phase transformer permits a current larger than the rated value to flow in the windings of the three-phase transformer, the transformer may burn out and an excessive current may flow through the controllable rectifier elements constituting the inverter main circuit, which destroys the elements, preventing the voltage self-commutated inverter from functioning properly.

The reason why a small amount of DC component is produced in the three phase output AC voltages of the inverter main circuit is that slight differences in characteristic between the controllable rectifier elements making up the inverter main circuit lead to differences in ON time between the controllable rectifier elements on the positive and negative polarity sides, creating a DC component in the output voltage. The generation of a DC component in the inverter output voltage reference value also causes DC components in the three phase output AC voltages of the inverter main circuit.

Although the problem of DC magnetization in the transformer causing overcurrent can be overcome by providing a gap in the iron core of the transformer to make it hard for magnetic saturation to take place in the iron core, this approach is not desirable because of larger size and higher cost.

SUMMARY OF THE INVENTION

The object of the present invention is to provide a highly reliable inverter control device capable of preventing not only the generation of overcurrent due to DC magnetization in the three-phase transformer, but also burnouts of the three-phase transformer and controllable rectifier elements.

The foregoing object is accomplished by an inverter control device comprising: an inverter control device according to this invention, comprising: a current DC component detecting circuit for detecting the current DC components contained in at least two of the three phase output AC currents of the inverter; a DC magnetization suppressor signal generating circuit for producing two correcting signals from the current DC components, the two correcting signals being used to balance in amount the three voltage DC components contained in the three phase output AC voltages of the inverter respectively; an output reference correcting circuit for correcting two of first output references in accordance with the two correcting signals and outputting three second references including the two corrected values and one of the first output reference; and a gate control circuit for controlling the three phase output AC voltages of the inverter according to the three second output references.

With this arrangement, the voltage DC components for two phases are regulated so that the imbalanced components contained in the three phase output AC voltages of the inverter may become zero between phases, which causes the DC current component of each phase to be zero, thereby suppressing DC magnetization.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is a circuit diagram for the current DC component detector of the inverter control device in FIG. 1;

FIG. 3 is a circuit diagram for the DC magnetization suppressor signal calculating circuit of the inverter control device in FIG. 1;

FIG. 4 is an equivalent circuit diagram for explaining a DC magnetization phenomenon in the transformer during inverter operation; and FIG. 5 is an equivalent circuit diagram for explaining how DC magnetization in the three-phase transformer is suppressed.

DETAILED DESCRIPTION OF THE PREFERRED EMBODIMENTS

Figure 1:
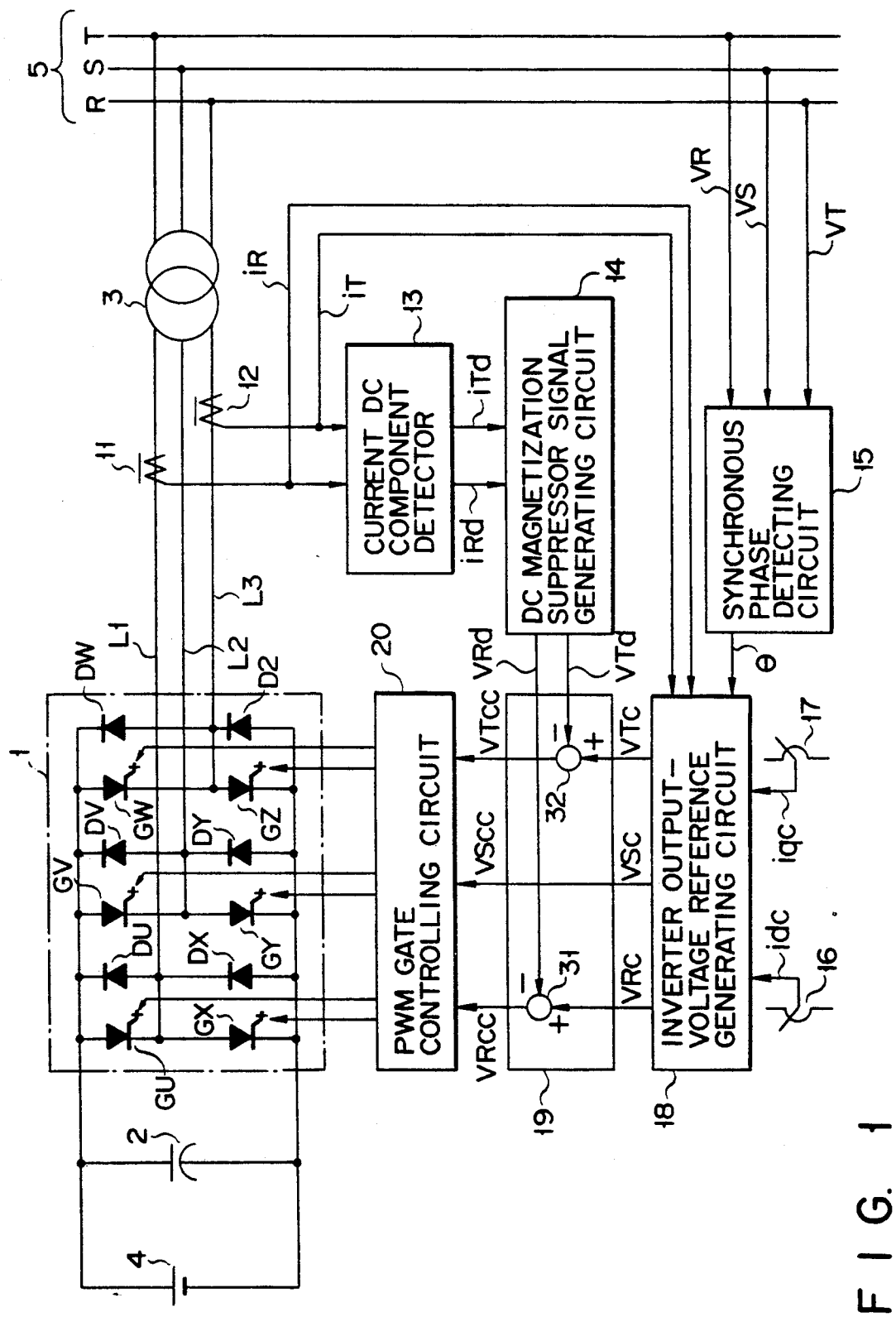
FIG. 1 is a functional block diagram for an inverter control device according to an embodiment of the present invention.

Referring to the accompanying drawings, an embodiment of the present invention will be explained.

FIG. 1 shows an overall arrangement of an embodiment of the present invention.

A DC capacitor 2 is connected across the DC side terminals of an inverter main circuit 1, the AC side terminals of which are connected to a three-phase transformer 3 on a phase basis: R phase, S phase, and T phase. Those inverter main circuit 1, DC capacitor 2, and three-phase transformer 3 constitute a voltage self-commutated inverter. This inverter is connected to a DC voltage source 4 via the DC side terminals of the inverter main circuit 1, while connected to a three-phase power system 5 via the three-phase transformer 3.

The inverter main circuit 1 is constructed by connecting controllable rectifier elements GU, GV, GW, GX, GY, and GZ, and rectifier elements DU, DV, DW, DX, DY, and DZ as shown in FIG. 1. For the controllable rectifier elements GU, GV, GW, GX, GY, and GZ, power electronics elements with a self-extinguishing function, such as GTOs (Gate Turn Off transistors) or power transistors may be used.

An inverter control device is composed of Hall CT circuits 11 and 12, which detect the R-phase and T-phase inverter output AC currents, respectively, a current DC component detector 13, a DC magnetization suppressor signal generating circuit 14, a synchronous phase detecting circuit 15, which detects the system voltage phase $\theta$ of the system voltages VR, VS, and VT of the three-phase AC system 5, an active current setting unit 16 to enter the active current reference value, a reactive current setting unit 17 to enter the reactive current reference value, an inverter output-voltage reference generating circuit 18, an output reference correcting circuit 19, and PWM gate controlling circuit 20.

The Hall CT circuits 11 and 12 are installed on the R-phase and T-phase lines L1 and L3 among the conductor wires L1 through L3 that connect the AC side terminals of the inverter main circuit 1 with the inverter side terminals of the three-phase transformer 3 on a phase basis. The Hall CT circuit 11 detects a Hall voltage, which is generated when the magnetic flux, caused by the current flowing through the line L1, penetrates through the Hall element, and supplies the output as an electrical signal. The Hall CT circuit 12 functions the same way.

The current DC component detector 13 is constructed as shown in FIG. 2, where reference character A indicates an operational amplifier, R1 and R2 indicate resistors, and C indicates a capacitor. Here, two operational amplifier A, resistors R1 and R2, and capacitors C make up two first-order time-lag circuits. The current DC component detector 13 detects DC components iRd and iTd from the inverter output AC currents iR and iT supplied from the Hall CT circuits 11 and 12.

Based on the DC components iRd and iTd from the current DC component detector 13, the DC magnetization suppressor signal generating circuit 14, which is constructed as shown in FIG. 3, obtains the inverter output voltage correcting signals VRd and VTd that balance the DC components in the three phase inverter output AC currents, and supplies the signal VRd and VTd.

The inverter output voltage reference generating circuit 18 receives the inverter output AC currents iR and iT, system voltage phase $\theta$, active current reference value idc, and reactive current reference value iqc. The generating circuit 18, according to the active current reference value idc and reactive current reference value iqc, produces the inverter output voltage references VRC, VSC, and VTC as the first output references that determines the three phase output voltages of the inverter main circuit 1 so that the inverter output AC currents iR and iT sensed at the Hall CT circuits 11 and CT 12 may be regulated.

The output reference correcting circuit 19, which is composed of two adders 31 and 32 as shown in FIG. 1, receives the inverter output voltage references VRC, VSC, and VTC and the inverter output voltage correcting signals VRd and VTd. The correcting circuit 19 corrects the inverter output voltage references VRC and VTC on a phase basis, according to the inverter output voltage correcting signals VRd and VTd, and supplies the corrected inverter output voltage references VRCC and VTCC as the two of second output references. The inverter output voltage reference VSC is supplied as the corrected output reference VSCC as the one of the second output reference without correction. The reason for this will be explained later.

The PWM gate control circuit 20 compares the corrected output references VRCC, VSCC, and VTCC with a triangular wave carrier signal and supplies gate signals that determine the ON time of each of the controllable rectifier elements GU, GV, GW, GX, GY, and GZ constituting the inverter main circuit 1.

Referring to FIGS. 4 and 5, how DC magnetization in the three-phase transformer is suppressed will be explained in connection with the embodiment. FIG. 4 shows a circuit for explaining a DC magnetization phenomenon in the transformer during inverter operation, and FIG. 5 is a circuit for depicting the principle of suppressing DC magnetization in the three-phase transformer.

For shortness' sake, DC magnetization will be described, referring to FIG. 4. It is known that single-phase transformers have an equivalent circuit as shown in FIG. 4, where reference character Z1 indicates the leakage impedance (the winding resistance plus the leakage inductance) on the inverter main circuit side of the transformer, Z2 indicates the leakage impedance on the AC system side of the transformer, and Zm indicates the magnetizing impedance (the iron loss plus the magnetizing inductance) of the transformer.

If the DC voltage component of the output voltage of the inverter main circuit is E and the AC system has no impedance to the DC voltage component, then the inverter main circuit, transformer, and AC system will form a circuit of FIG. 4 with respect to the DC voltage component E. Thus, depending on the DC voltage component E, DC currents i1 and i2 will flow. DC current flowing through the magnetizing inductance of the transformer causes DC magnetization. That is, the DC current i1 causes DC magnetization. Since the magnetizing inductance is much larger than the leakage impedance, it will take long time for the DC current i1 to become so large that the magnetic flux in the transformer is saturated to generated an AC overcurrent.

In FIG. 5, the impedances corresponding to the inductances of the transformer and AC system are combined into a single impedance for each phase: impedances ZmR, ZmS, and ZmT.

It is assumed that the DC voltage components for the individual phases of the inverter main circuit are ER, ES, and ET, respectively. To simplify an explanation, the impedances ZmR, ZmS, and ZmT for the individual phases are assumed to be the same value Z. In the three-phase circuit of FIG. 5, if the following relations hold:

$$ER = ES = ET \quad (1)$$

then, the DC current components iIR, iIS, and iIT flowing through the individual phases will be:

$$iIR = iIS = iIT = 0 \quad (2)$$

That is, the differences between the DC voltage components ER, ES, and ET for the individual phases allow the DC current components iIR, iIS, and iIT to flow. Derived from the three phase circuit conditions is the next equation:

$$iIR - iIS - iIT = 0 \quad (3)$$

Thus, if the DC current components for two phases among three are detected, then the DC component for the remaining phase will be determined. Based on these equations:

$$\begin{aligned} ER - ES &= Z * (iIR - iIS) \\ &= Z * (2iIR - iIT) \\ &= (2*Z) * \{iIR - (\tfrac{1}{2})*iIT\} \end{aligned} \quad (4)$$

$$\begin{aligned} ET - ES &= Z * (iIT - iIS) \\ &= Z * (2iIT - iIR) \\ &= (2*Z) * \{iIT - (\tfrac{1}{2})*iIR\} \end{aligned} \quad (5)$$

if the DC voltage component ER is controlled so as to meet:

$$Z (2iIR - iIT) = 0 \quad (6)$$

and the DC voltage component ET is controlled so as to meet:

$$Z (2iIT - iIR) = 0 \quad (7)$$

then the relations (1) will hold. Thus, the relations (2) will hold, so that even if each phase has a DC voltage component, the DC current component flowing through each phase becomes zero, which suppresses DC magnetization. With this approach, DC magnetization is suppressed by regulating only imbalanced components without nullifying the DC voltage component for each phase of the inverter main circuit, thereby making the control response of DC magnetization suppression faster.

In the embodiment, equations (4) and (5) are calculated at the DC magnetization suppressor signal generating circuit 14 constructed as shown in FIG. 3. Reference character 21a and 21b indicate amplifiers that multiply by a constant of $\tfrac{1}{2}$ in equations (4) and (5), 22a and 22b adders that calculate the terms in braces in equations (4) and (5), and 23a and 23b amplifiers that calculate the term (2*Z) in equations (4) and (5).

Now, the operation of the embodiment constructed as mentioned above will be explained.

Based on the active current reference value idc from the active current setting unit 16 and the reactive current reference value iqc from the reactive current setting unit 17, the inverter output voltage reference generating circuit 18 produces the inverter output voltage references VRC, VSC and VTC that determine the three phase voltages of the inverter main circuit 1 so that the inverter output AC currents iR and iT sensed at the Hall CT circuits 11 an 12 may be regulated. In the calculation of the inverter output voltage references VRC, VSC, and VTC, the system voltage phase $\theta$ sensed at the synchronous phase detecting circuit 15 is used to determine the phases for the system voltages VR, VS, and VT of the three-phase AC system 5.

The current DC component detector 13 receives the inverter output AC currents iR and iT sensed at the Hall CT circuits 11 and 12, and detects the DC components iRd and iTd contained in the inverter output AC currents iR and iT.

In current transformers, which operate on the same principle as the aforementioned transformers, DC magnetization creates the same problem, so that the signal containing a DC component cannot be sensed. In the embodiment, however, use of Hall CT circuits enables the signal containing AC and DC components to be detected unlike current transformers.

In the current DC component detector 13, the circuits of FIG. 2 perform a first-order time-lag operation on the inverter output AC currents iR and iT to detect DC components iRd and iTd.

The DC magnetization suppressor signal generating circuit 14 receives the DC components iRd and iTd of the inverter output AC currents iR and iT and then produces the right sides of equations (4) and (5) as the inverter output voltage correcting signals VRd and VTd. In the generating circuit 14 of FIG. 3, if the impedance Z multiplied at the amplifiers 23a and 23b differs between R and T phases, it must be adjusted for each phase.

The output reference correcting circuit 19 receives the inverter output voltage references VRC, VSC, and VTC from the inverter output voltage reference generating circuit 18 and the inverter output voltage correcting signals VRd and VTd from the DC magnetization suppressor signal generating circuit 14. The correcting circuit 19 then subtracts the DC component VRd from the inverter output voltage reference VRC to correct the DC component voltage ER in the R phase of the inverter output voltage on the right side of equation (4) and supplies it as the corrected output reference VRCC. The correcting circuit 19 also subtracts the DC component VRd from the inverter output voltage reference VTC to correct the DC component voltage ET in the T phase of the inverter output voltage on the right side of equation (5) and supplies it as the corrected output reference VTCC.

In the embodiment, since the DC component voltage ES in the S phase of the inverter output voltage is not corrected, the inverter output voltage reference VSC is supplied as the corrected reference VSCC.

The PWM gate controlling circuit 20 compares the corrected output references VRCC, VSCC, and VTCC with a triangular wave carrier signal and produces gate signals that determine the ON time of the controllable rectifier elements GU, GV, GW, GX, GY, and GZ constituting the inverter main circuit 1.

For a detailed explanation of PWM gate control using inverter output voltage reference, an example is disclosed in Shun-ichi Hirose, et al., "Application of a digital instantaneous current control for static induction thyristor converters in the utility line," PCIM Proceeding, pp. 343–349 Dec. 8, 1988 in Japan.

The above-described current DC component detector 13, DC magnetization suppressor signal generating circuit 14, output reference correcting circuit 19, and PWM gate controlling circuit 20 combine to control the DC component of the inverter output voltage so that equations (6) and (7) may hold, which performs control so as to fulfill equation (1). Consequently, the DC current component in each of three phases becomes zero, thereby suppressing DC magnetization.

Since in the embodiment of the present invention, DC magnetization suppression of the three-phase transformer is performed by balancing the DC components of the three phase output voltages of the inverter, making use of the characteristics of the three-phase transformer, an increase in the DC magnetization suppressing response speed of the three phase transformer can reduce the magnetizing current that saturates the iron core flux in the three-phase transformer, which suppresses overcurrent due to DC magnetization without using a large-capacity three-phase transformer with a gap in the iron core, thereby achieving a small inverter at low cost.

In order to balance the DC components of the three phase output voltages of the inverter, DC magnetization is suppressed by detecting the current DC components of two phases for the three phase output currents of the inverter and correcting the inverter output voltages for the two phase, which makes control easier, thereby simplifying the inverter control device.

While in FIG. 1, the DC magnetization suppressor signal generating circuit 14 and output reference correcting circuit 19 are constructed using electronic circuits, their functions may be programmed in software using microcomputers.

The same effects as with the foregoing embodiment may be obtained by detecting the inverter output AC currents in R and S phases or S and T phases and performing DC magnetization control as mentioned above.

This invention is not limited to the approach that DC magnetization suppressing control is performed by detecting only the current DC components in two phases for the three phase output currents of the inverter, but may be practiced in other ways. For example, use of the current DC components in three phases may enable DC magnetization suppressing control.

Additional advantages and modifications will readily occur to those skilled in the art. Therefore, the invention in its broader aspects is not limited to the specific details, representative devices, and shown and described herein. Accordingly, various modifications may be without departing from the spirit or scope of the general inventive concept as defined by the appended claims and their equivalents.

What is claimed is:

1. An inverter control device for controlling an inverter which generates three phase output AC voltages which include first, second and third phases and respective three phase AC currents which include first, second and third phases and is connected to an AC power system via a three-phase transformer, comprising:

current DC component detecting means for detecting current DC components each contained in at least two of the three phase output AC currents of said inverter;

correcting signal generating means for calculating a difference E1 between the voltage DC components corresponding to first and third phases, respectively and a difference E2 between the voltage DC components corresponding to second and third phases, respectively, using the following equations, where the impedance of said three-phase transformer is Z, and the current DC components corresponding to the first and second phases are i1R and i1T:

$$E1 = (2*Z) * \{i1R - (\tfrac{1}{2})*i1T\}$$

$$E2 = (2*Z) * \{i1T - (\tfrac{1}{2})*i1R\}$$

and outputting E1 as a corresponding signal for the first phase and E2 as a correcting signal for the second phase, the two correcting signals being used to balance in amount three voltage DC components contained in the three phase output AC voltages of said inverter respectively;

output reference correcting means for correcting two of first output references in accordance with said two correcting signals to obtain two corrected values and outputting three second output references including the two corrected values and one of the first output references; and control means for controlling said inverter according to said three second output references so as to regulate the three phase output AC voltages.

2. An inverter control device according to claim 1, further comprising:

synchronous phase detecting means for detecting the phase of the system voltage of said AC power system;

active current-setting means for setting an active current reference value to determine an active power which is to supply from said inverter to said AC power system;

reactive current setting means for setting a reactive current reference value to regulate a reactive power of said AC power system; and inverter output voltage reference generating means for generating said first output references in accordance with said system voltage phase, active current reference value, and reactive current reference value.

3. An inverter control device according to claim 1, wherein said correcting signal generating means comprises:

first multiplying means for multiplying said current DC component i1R by a constant of 0.5;

second multiplying means for multiplying said current DC component i1T by a constant of 0.5;

first adder means for adding said current DC component i1R to the result of said second multiplying means;

second adder means for adding said current DC component i1T to the result of said first multiplying means;

third multiplying means for multiplying the result of said first adder means by a constant twice the first phase impedance of said three-phase transformer; and fourth multiplying means for multiplying the result of said second adder means by a constant twice the second phase impedance of said three-phase transformer.

4. An inverter control device for controlling an inverter which generates three phase output AC voltages including first, second and third phases and respective three phase AC currents including first, second, and third phases, and is connected to an AC power system via a three-phase transformer, comprising:

current DC component detecting means for detecting current DC components each contained in at least two of the three phase output AC currents of said inverter, said current DC component detecting means including, current detecting means for detecting at least two of the three phase output AC currents of said inverter, operational amplifier means for performing first-order time-lag operation on the output AC currents detected by said current detecting means and detecting current DC components contained in said output AC currents, said operational amplifier means including, at least two first-order time-lag circuits, and each of said first-order time-lag circuits including a first resistor for receiving said output AC current, an amplifier having a first input terminal for receiving said output AC current which has passed through said first resistor, a second terminal to which a reference potential is applied, and an output terminal for supplying said DC component contained in said output AC current, a capacitor connected across the first current, a capacitor connected across the first input terminal and output terminal of said amplifier, and a second resistor connected in parallel with said capacitor;

correcting signal generating means for calculating a difference E1 between the voltage DC components corresponding to first and third phases, respectively and a difference E2 between the voltage DC components corresponding to second and third phases, respectively, using the following equations, if the impedance of said three-phase transformer is Z, and the current DC components corresponding to the first and second phases are i1R and i1T:

$$E1 = (2*Z) * \{i1R - (\tfrac{1}{2})*i1T\}$$

$$E2 = (2*Z) * \{i1T - (\tfrac{1}{2})*i1R\}$$

and outputting E1 as a corresponding signal for the first phase and E2 as a correcting signal for the second phase, the two correcting signals being used to balance in amount three voltage DC components contained in the three phase output AC voltages of said inverter respectively;

output reference correcting means for correcting two of first output references in accordance with said two correcting signals to obtain two corrected values and outputting three second output references including the two corrected values and one of the first output references; and control means for controlling said inverter according to said three second output references so as to regulate the three phase output AC voltages.

* * * * *

UNITED STATES PATENT AND TRADEMARK OFFICE
CERTIFICATE OF CORRECTION

PATENT NO. : 5,177,428

DATED : January 5, 1993

INVENTOR(S) : Syunichi HIROSE, et al

It is certified that error appears in the above-identified patent and that said Letters Patent is hereby corrected as shown below:

Column 8, line 12 change "11T" to --i1T--.

Signed and Sealed this

Eighteenth Day of January, 1994

Attest:

BRUCE LEHMAN

Attesting Officer   Commissioner of Patents and Trademarks